(12) United States Patent
O'Steen et al.

(10) Patent No.: US 12,446,735 B2
(45) Date of Patent: Oct. 21, 2025

(54) BATHTUB SAFETY GATE (71) Applicants: Luke O'Steen, Jacksonville Beach, FL (US); Richard Harold O'Steen, Jacksonville Beach, FL (US)

(72) Inventors: Luke O'Steen, Jacksonville Beach, FL (US); Richard Harold O'Steen, Jacksonville Beach, FL (US)

( * ) Notice: Subject to any disclaimer, the term of this patent is extended or adjusted under 35 U.S.C. 154(b) by 0 days.

(21) Appl. No.: 18/967,578

(22) Filed: Dec. 3, 2024

(65) Prior Publication Data
US 2025/0185854 A1 Jun. 12, 2025

Related U.S. Application Data (60) Provisional application No. 63/606,656, filed on Dec. 6, 2023.

(51) Int. Cl.
A47K 3/34 (2006.01)
A47K 3/30 (2006.01)
F16B 47/00 (2006.01)

(52) U.S. Cl.
CPC .............. *A47K 3/34* (2013.01); *F16B 47/006* (2013.01); *A47K 2003/307* (2013.01)

(58) Field of Classification Search
CPC ...... A47K 3/34; A47K 2003/307; A47K 3/38; A47K 3/30; A47K 3/302; F16B 47/006
USPC ............................................. 4/557, 558, 607
See application file for complete search history.

(56) References Cited

U.S. PATENT DOCUMENTS

| 1,732,798 | A | * | 10/1929 | Falzer | A47K 3/38 4/558 |
| 2,095,645 | A | * | 10/1937 | Lewis | A47K 3/34 4/607 |
| 3,783,456 | A | * | 1/1974 | Doan | A47K 3/34 4/557 |
| 4,888,835 | A | | 12/1989 | Baumann | |
| 4,916,764 | A | * | 4/1990 | Meaden | A47K 3/38 4/558 |
| 5,249,315 | A | | 10/1993 | Moylan | |
| 5,365,619 | A | | 11/1994 | Solomon | |
| 5,732,419 | A | | 3/1998 | Feist | |
| 5,771,504 | A | * | 6/1998 | Steiner | A47K 3/38 4/558 |
| 5,771,505 | A | | 6/1998 | Reynolds | |
| 5,918,327 | A | | 7/1999 | Vance | |

(Continued)

*Primary Examiner* — David P Angwin
*Assistant Examiner* — William R Klotz
(74) *Attorney, Agent, or Firm* — Mark Young, PA (57) ABSTRACT

A bathtub safety gate provides a secure and adjustable barrier across a bathtub, enhancing safety and preventing unintended access, even access between the bottom edge of the barrier and the top of edge of the side of a tub. The gate features a flexible sheet with a retention structure along its bottom edge, enabling secure attachment to the top edge of a side of the bathtub. The sheet is mounted on a rotatable spool housed within a slotted casing, allowing it to be extended or retracted as needed. Tub clamps with adjustable jaws grip the bathtub edge, while a retainer securely holds the retention structure. The gate includes a wall attachment assembly and a housing attachment with suction cups for stability and easy installation on opposing walls. Additional features, such as a spring mechanism for automatic retraction and a damper for smooth operation, enhance functionality.

20 Claims, 13 Drawing Sheets (56) References Cited

U.S. PATENT DOCUMENTS

| | | | | |
|---|---|---|---|---|
| 6,041,454 | A * | 3/2000 | Summerford | A47H 23/01 4/558 |
| 6,148,452 | A * | 11/2000 | Kirsopp | A47K 3/38 4/609 |
| 6,655,444 | B2 * | 12/2003 | Goldenberg | G09F 23/00 160/405 |
| 7,269,861 | B1 * | 9/2007 | Miller | A47K 3/302 4/609 |
| 7,328,466 | B1 | 2/2008 | Bowen | |
| 8,443,470 | B2 | 5/2013 | Webb | |
| 10,975,615 | B1 * | 4/2021 | Vega | E06B 9/24 |
| 2008/0210385 | A1 * | 9/2008 | Sawyers | E06B 9/54 160/31 |
| 2017/0172354 | A1 | 6/2017 | Ross | |
| 2018/0184852 | A1 * | 7/2018 | Ross | A47K 3/001 |

\* cited by examiner

BATHTUB SAFETY GATE

RELATED APPLICATION

This application is a nonprovisional of and claims the benefit of priority of U.S. provisional application 63/606,656 filed Dec. 6, 2023.

FIELD OF THE INVENTION

This invention relates generally to baby gates, and, more particularly, to a gate that prevents children from entering a bathtub.

BACKGROUND OF THE INVENTION

Children risk danger and serious injury by falling or climbing into a bathtub. One risk is drowning. Young children may lack the coordination and strength to keep themselves afloat. Even a small amount of water in the tub can be dangerous if a child falls face-first and is unable to lift their head out of the water. A curious child may fill an otherwise empty tub, creating a risk of drowning. A tub with a mere inch of water poses a drowning risk to young children.

Another risk is slipping. Bathrooms are typically smooth-surfaced, and tubs can become slippery when wet. Children can easily slip and fall when getting into or out of the bathtub, which may lead to injuries such as bumps, bruises, or even more severe injuries like head trauma. If a child is climbing into or out of the bathtub and loses balance, they may suffer head injuries if they hit their head on the hard surface of the bathtub or bathroom floor.

Another risk is scalding. Hot water in the bathtub can cause burns or scalds, especially if a child turns on the hot water tap and the water temperature is too high. Children may not be able to judge water temperature accurately, putting them at risk of burns.

A device is needed that reduces risk of entry into a bathtub by a child. The device should be easy to implement and disengage to allow use of the bathtub with adult supervision. The device should prevent access to the bathtub by crawling beneath a barrier. Curtains and other similar devices, allow entry through the unsecured bottom.

The invention is directed to overcoming one or more of the problems and solving one or more of the needs as set forth above.

SUMMARY OF THE INVENTION

To solve one or more of the problems set forth above, in a non-limiting exemplary implementation, a bathtub safety gate according to principles of the invention provides a secure barrier across a bathtub, preventing unintended access or promoting safety during use. The safety gate is constructed with multiple components to ensure stability, flexibility, and ease of installation.

A primary component of the safety gate is a flexible sheet with defined edges: a first edge, an opposite second edge, a top edge, and a bottom edge. The bottom edge incorporates a retention structure, which is flexible and helps secure the gate to the bathtub. This retention structure can take various forms, such as a hem formed by folding and fastening portions of the sheet, a sleeve containing a flexible insert like a rope, or a flexible tube attached to the bottom edge.

The flexible sheet is mounted on a spool that is housed within a slotted housing. The housing features a vertical slot through which the sheet extends. The spool is designed to rotate within the housing, allowing the sheet to be extended or retracted. A spring mechanism may bias the spool to a wound state, facilitating automatic retraction of the sheet, and a damper may be included to control the speed of spool rotation for smoother operation.

The gate is secured to the bathtub using tub clamps and to walls using wall attachments. Each tub clamp features a pair of adjustable jaws that grip the top edge of the bathtub. Above the jaws, a retainer defines a compartment to hold the retention structure, with a narrow slot through which the flexible sheet passes. This design ensures the retention structure remains securely within the compartment while allowing the sheet and retention structure to slide relative to the retainer.

On one end, the flexible sheet is attached to the spool, which is positioned adjacent to a first wall. The spool assembly is supported by a housing attachment that includes suction cups for securing it to the wall. A housing attachment may feature a releasable coupling mechanism, such as a hook, for easy installation and removal.

On the opposite end, the flexible sheet connects to a wall attachment assembly positioned near a second wall. This assembly includes a first body with suction cups for wall attachment, an edge gripper for securing the flexible sheet, and a coupling mechanism, such as a hook, for releasable connection between the body and the edge gripper.

The safety gate is designed for use with bathtubs situated between opposing walls. It provides a robust yet adjustable barrier that accommodates variations in bathtub and wall configurations. The flexible retention structure, adjustable tub clamps, and suction cup attachments allow for secure installation and stability during use. Additional features such as the spring mechanism and damper enhance functionality and user convenience.

BRIEF DESCRIPTION OF THE DRAWINGS

The foregoing and other aspects, objects, features, and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary bathtub safety gate according to principles of the invention includes a flexible gate dispensed from a roll between opposed walls of a bathtub at the entrance side of the bathtub. The gate includes a bottom edge with increased thickness, such as a prominent hem, flexible bulbous structure at the bottom edge, or a sleeve formed along the bottom edge and through which a flexible material having a thickness greater than that of the sheet material extends. One or more clamps attach to the entrance side of the bathtub. Each clamp includes an edge retainer 138 (i.e., a retainer) configured to retain the bottom edge of the gate. Releasable attachments, such as suction cups, secure the gate to the opposed walls. Hooks that may be disengaged from rings allow at least one side of the gate to be released from the attachments. When released, the flexible gate retracts into a spring-biased spool of a roller assembly. The clamps reduce risk of a child entering the tub between the gate and top edge of the entrance side of the tub, while allowing lateral (wall-to-wall) motion of the gate.

Figure 1:
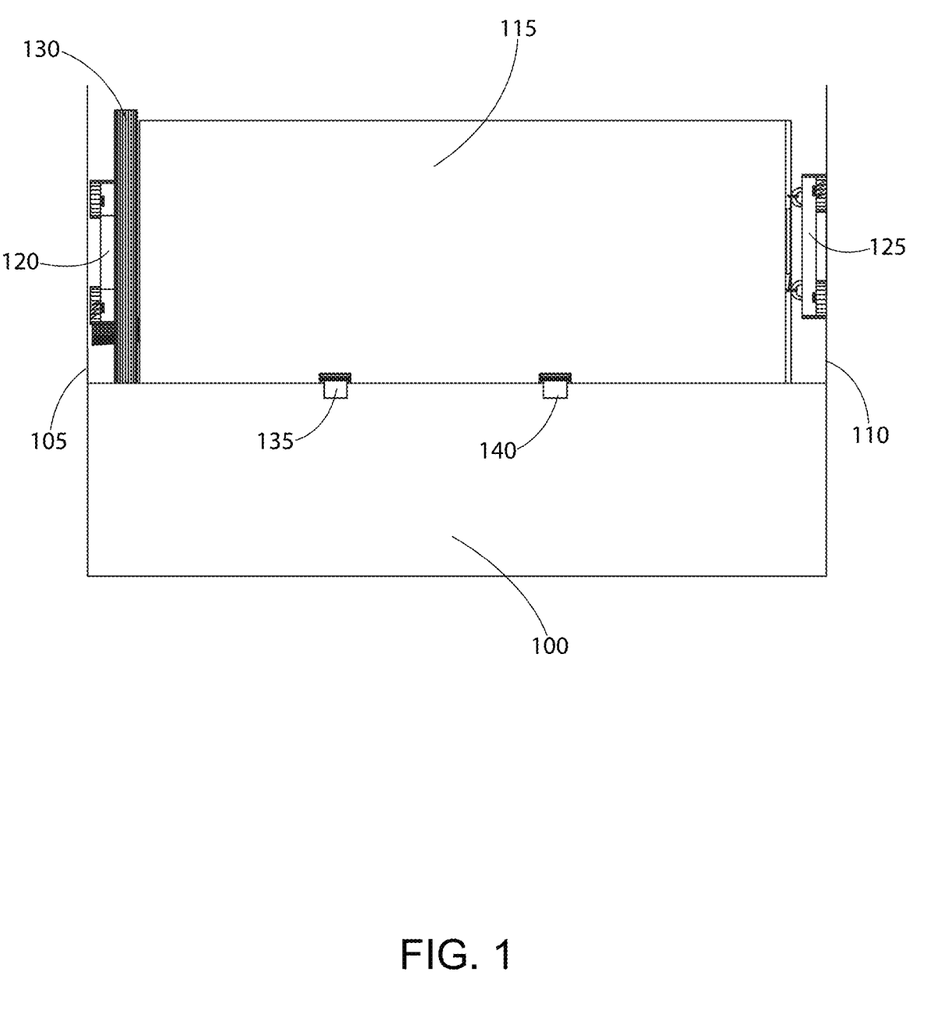
FIG. 1 is a front view of an exemplary bathtub equipped with a bathtub safety gate according to principles of the invention.
Figure 2:
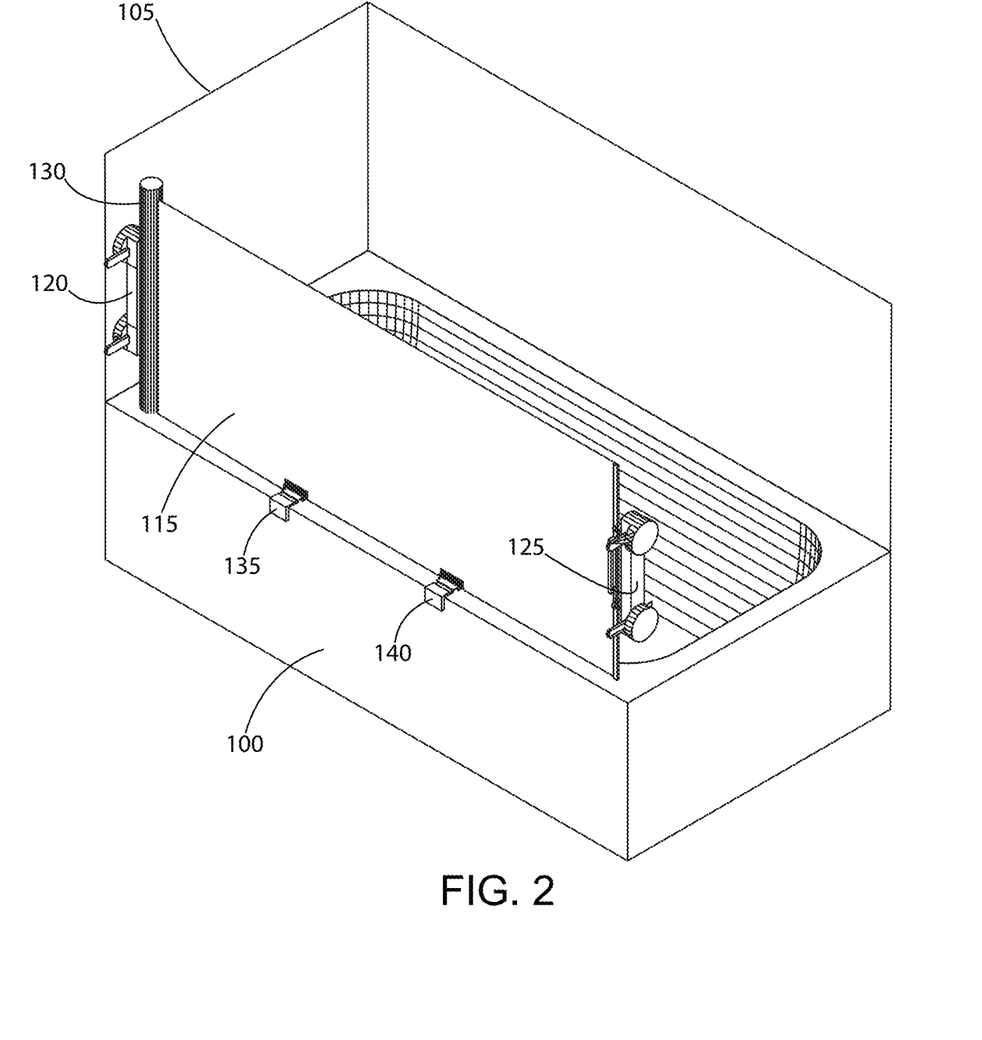
FIG. 2 is a perspective view of an exemplary bathtub equipped with a bathtub safety gate according to principles of the invention.

FIGS. 1 and 2 conceptually illustrate an exemplary bathtub equipped with a bathtub safety gate according to principles of the invention. A flexible sheet material (i.e., gate) 115 is dispensed from a roller assembly 130 between opposed walls 105, 110 of a bathtub at the entrance side 100 of the bathtub. The gate 115 may be a flexible solid sheet, woven fabric, mesh, or the like that is translucent, transparent, or opaque. Any material that is suitable as a physical barrier for children and flexible enough for winding onto a roll may be used. The material should be suitable for use in the presence of water, soap and household cleaners and preferably be easy to clean.

Figure 11:
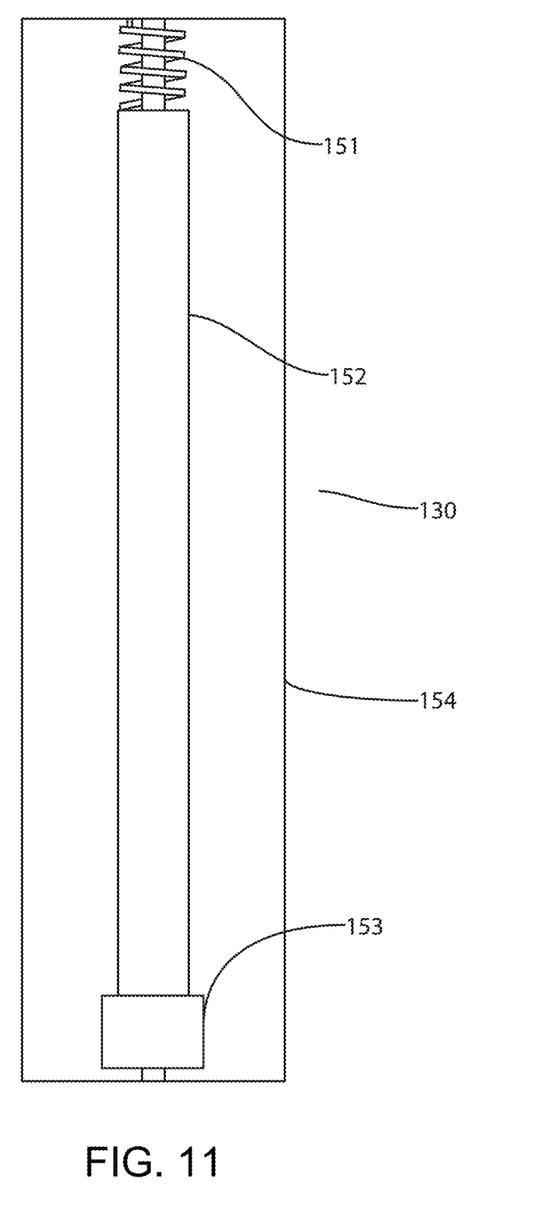
FIG. 11 is a schematic that conceptually illustrates a roller assembly for a bathtub safety gate according to principles of the invention.

The gate 115 is contained in and dispensed from a roller assembly 130. Referring to FIG. 11, in a preferred implementation, the roller assembly 130 includes a slotted housing 154 (casing) that contains a rotatable spool 152 (e.g., roller tube). The housing 154 includes a vertical slot through which the gate 115 extends. In an exemplary embodiment, the spool is a spring-biased spool 152 that operates using a coiled spring mechanism 151, of the type commonly used for screen window treatments. The gate material may be wrapped around and unwrapped from the spool 152. The coiled spring mechanism 151 stores potential energy when compressed. The spring mechanism is configured to exert force to roll the gate onto the spool 152 when the free end of gate is not restrained. The spring-biased spool 152 provides a simple, unobtrusive, and effective way to span between opposing walls of bathtubs. The spring-biased spool 152 also maintains the gate in tension.

Optionally, one or more rotary dampers 153 may be incorporated into the roller assembly 130 to reduce the speed of retraction. Rotation of the spool 152 causes a dampening mechanism in the rotary damper to rotate. Nonlimiting examples of suitable rotary dampers include viscous rotary dampers, which use a fluid, e.g., silicone or oil, to provide resistance to motion of a rotor; friction rotary dampers (like an automotive drum or disc brake) that rely upon frictional forces to dampen rotary motion; magnetic rotary dampers that use magnetic fields to provide resistance; spring-loaded rotary dampers that utilize a spring mechanism (compression and/or tension) to provide resistance; and hydraulic rotary dampers that use a rotor to force hydraulic fluid through a restricted passage, creating controlled resistance.

Referring again to FIGS. 1 and 2, the gate 115 is attached to one wall 105 with a roller side attachment 120. The gate 115 is attached to the opposite wall 110 with another attachment 125. Each attachment 120, 125, a wall attachment, is removable. As nonlimiting examples, each attachment comprises wall attaching suction cups connected to a body which connects to the gate 115 or roller assembly 130. Releasable retainers are provided to detach the body from the gate 115 at the wall 110 opposite the roller assembly 130. Thus, the gate 115 may be retracted into the roller assembly 130 to expose and the side 100 of the tub and facilitate use thereof.

One or more clamps 135, 140 attach to the entrance side 100 of the bathtub. Each clamp 135, 140 includes an edge retainer 138 (i.e., a retainer aka edge retainer) configured to grip the bottom edge of the gate 115. The clamps 135, 140 reduce risk of a child entering the tub between the gate and top edge of the entrance side of the tub.

By way of example and not limitation, FIGS. 3, 4, 12 and 13 conceptually illustrate an exemplary clamp 135 for a bathtub safety gate according to principles of the invention. With reference to the embodiment of FIGS. 3 and 4, each clamp 135 is a mechanical device configured to grip the top side 100 of the bathtub. The clamp includes jaws, pads, or some form of gripping surfaces 131, 132 that come into contact with opposite surfaces (inner surface and outer surface) of the top side 100 of the bathtub. Being generally u-shaped, the clamp 135 straddles the top edge of the side 100 of the tub. The surfaces 131, 132 are designed to provide sufficient friction or pressure to hold the clamp 135 in place. The clamp 135 is adjustable to accommodate different sizes and shapes of top edges of a tub. This adjustability is achieved through a sliding joint that allows a bridge 136, tenon or dowel to adjustably slide into a corresponding socket, mortise, or channel in top side 133 and/or top side 134 to customize the clamp's opening width 139, i.e., the distance between gripping surfaces 131, 132. In lieu of sliding joints, threaded joints may be used. Various mechanisms may be provided to lock the joint in place when a desired opening width 139 is achieved. Such mechanisms may include screws and cam locks. Alternatively, the sliding joints may be spring biased with one or more spring mechanisms urging the jaws 131, 132 together.

Figure 3:
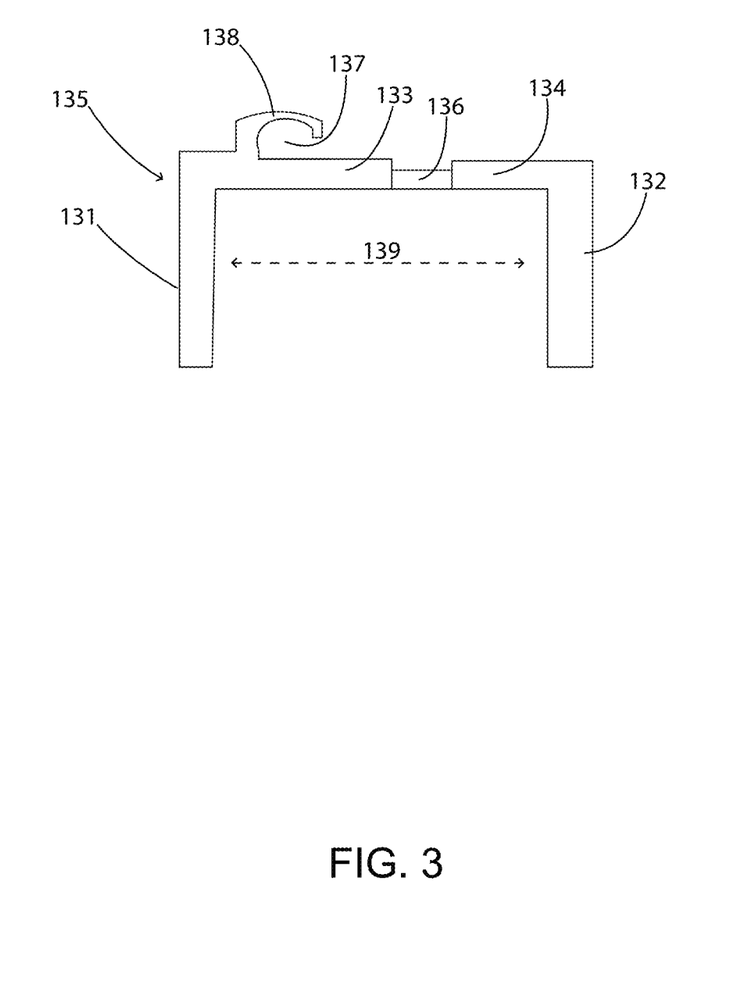
FIG. 3 is a side (profile) view of an exemplary clamp for a bathtub safety gate according to principles of the invention.
Figure 4:
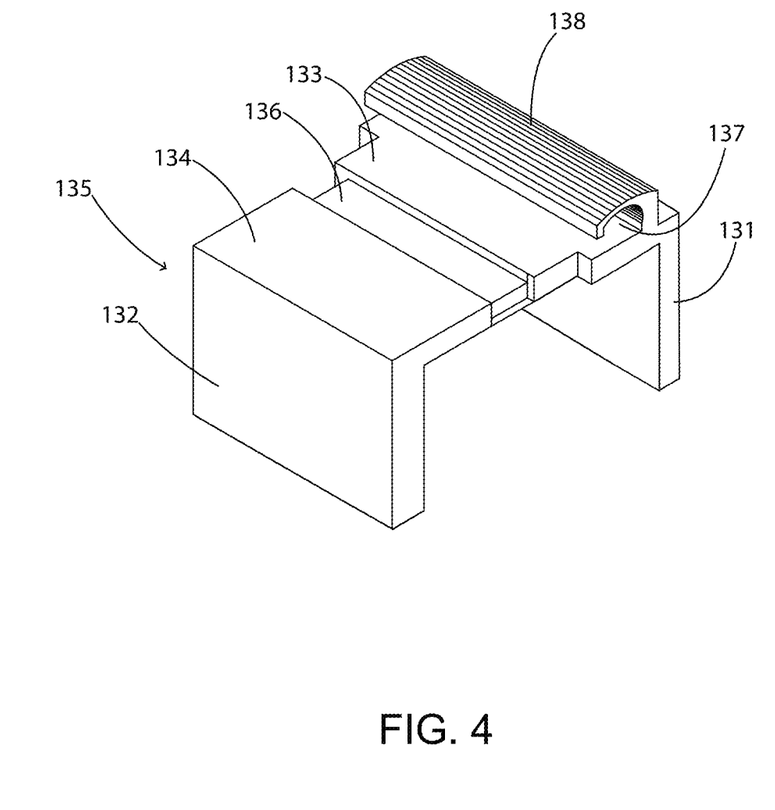
FIG. 4 is a perspective view of an exemplary clamp for a bathtub safety gate according to principles of the invention.

The exemplary clamp 135 includes an edge retainer 138. The edge retainer 138 defines a compartment 137, through which an increased thickness portion (retention structure) at the bottom edge of the gate 115 may be received. Such engagement impedes movement of the bottom edge of the gate 115 away from the top edge of the side 100 of the tub. However, such engagement does not appreciably impede side-to-side movement of the retention structure.

Figure 12:
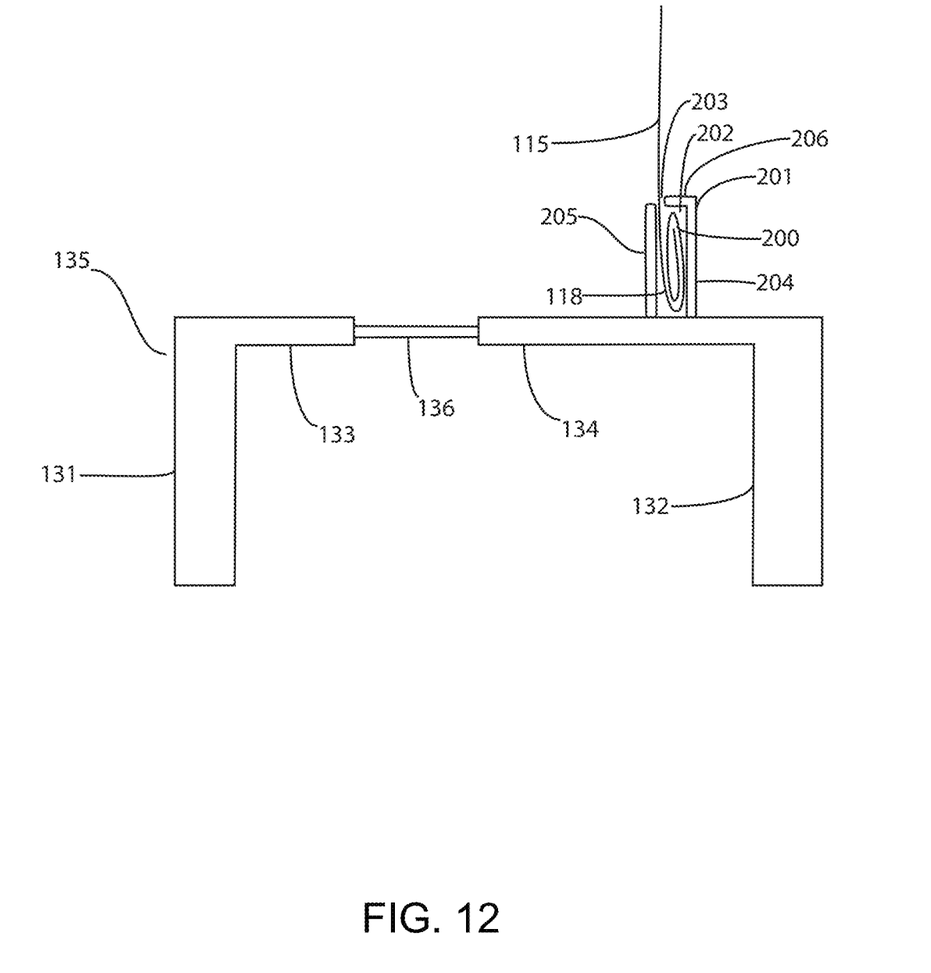
FIG. 12 is a schematic that conceptually illustrates a hemmed bottom end for a bathtub safety gate according to principles of the invention.
Figure 13:
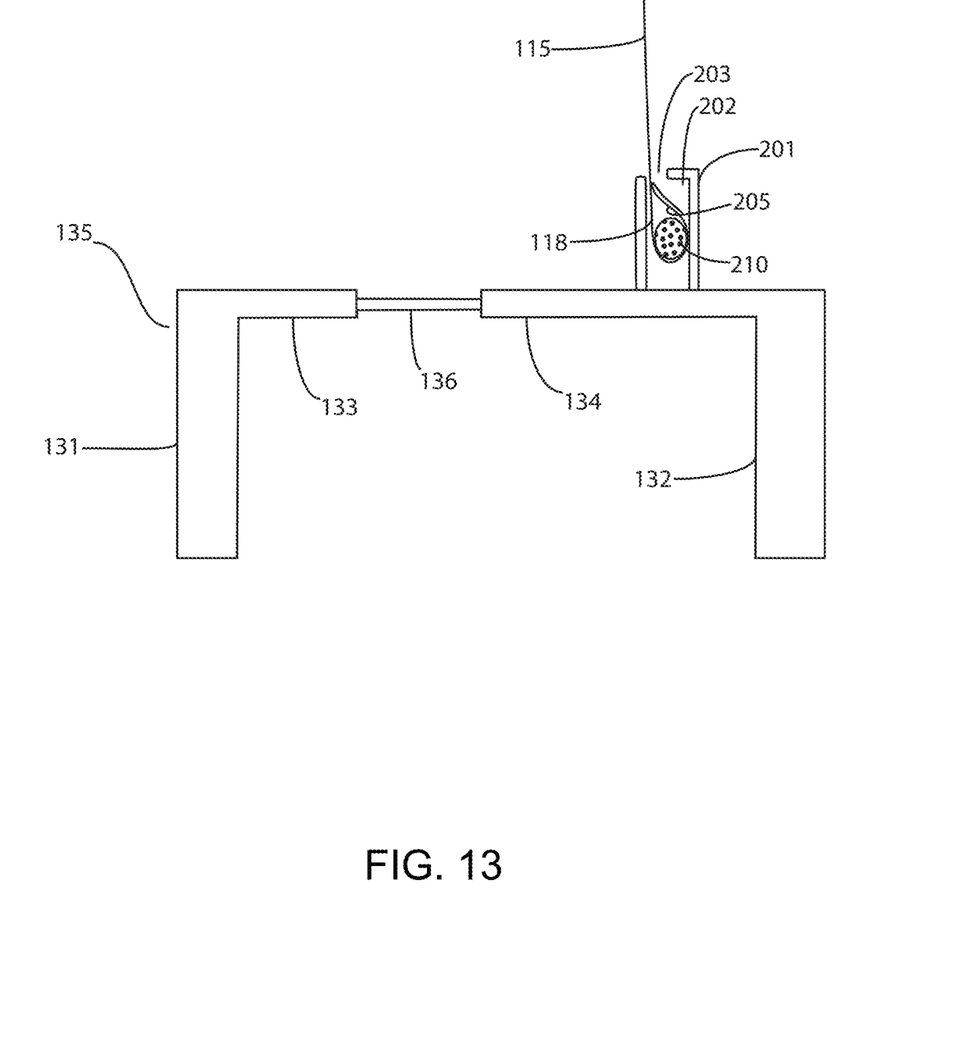
FIG. 13 is a schematic that conceptually illustrates a sleeved bottom end for a bathtub safety gate according to principles of the invention.

The clamp 135 of FIGS. 12 and 13 include a slightly different edge retainer comprised of two uprights 204, 205 extending upwardly from an upper surface of the clamp 135. At least one upright includes a distal flange, providing an L-shape to the upright. The flange 206 and other upright 205 define a slot 203. The slot 203 is wide enough to permit passage of the gate 115 but not the increased thickness bottom edge 118 of the gate 115. The bottom edge 118 is retained in a compartment 202 defined by the uprights 204, 205. The compartment 202 is sized to allow lateral (side-to-side) movement of the bottom edge 118 without appreciable resistance from the uprights 204, 205. The bottom edge 118 (which includes a retention structure) is slidably disposed in the compartment 202 of the retainer.

In one embodiment as shown in FIG. 12, the retention structure of the bottom edge 118 comprises a hem 200 formed by a plurality of folded over portions of the gate 115. The folded over portions may be bonded, stitched, or otherwise mechanically fastened together.

In another embodiment as shown in FIG. 13, the retention structure of the bottom edge comprises a sleeve 205 containing an insert 210. The sleeve 205 may be formed by folding over a portion of the bottom edge 118 and affixing the edge of the fold over to the gate 115 by stitching, bonding, or otherwise mechanical fastening. The sleeve 205 defines a compartment in which the insert 210 is received. The insert 210 has a thickness greater than the thickness of the gate 115, fits within the sleeve 205, and, within the sleeve 205, fits within the compartment 202. Additionally, the insert 210 is flexible to allow rolling (i.e., winding) onto a spool. Nonlimiting examples of suitable inserts include cord, rope, and lines comprised of natural or synthetic fibers or other materials.

Figure 5:
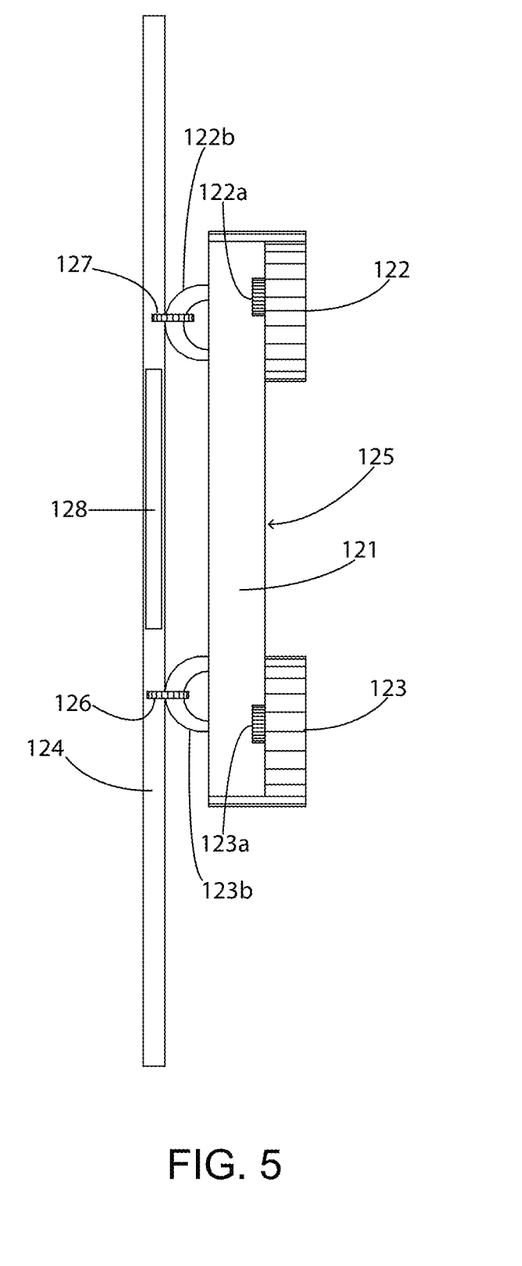
FIG. 5 is a front view of an exemplary gate end wall attachment for a bathtub safety gate according to principles of the invention.
Figure 6:
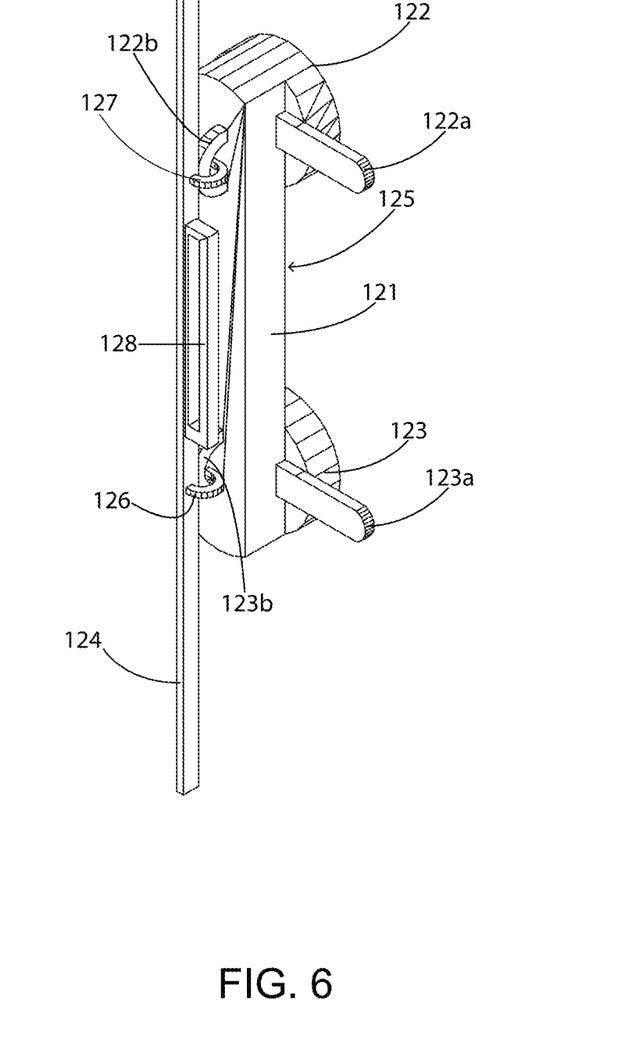
FIG. 6 is a perspective view of an exemplary gate end wall attachment for a bathtub safety gate according to principles of the invention.

FIGS. 5 and 6 conceptually illustrate an exemplary gate-end wall attachment 125 for a bathtub safety gate according to principles of the invention. This attachment 125 releasably secures the free end of the gate 115 to the wall 110 opposite the roller assembly 130. The attachment 125 includes a rigid body 121. A pair of suction cups 122, 123 extend from one side of the rigid body 121. In the exemplary embodiment, each suction cup 122, 123 includes a suction release lever 122a, 123a. The suction cups 122, 123 releasably engage a wall, such as wall 110.

Each lever-controlled suction cup 122, 123 includes a concave, flexible cup made of an elastomeric material, such as rubber or silicone. Each cup has a lip that helps in creating a seal against a wall surface. To adhere to a wall surface, the suction cup is initially pressed onto the desired area. The flexibility of the cup allows air to be expelled, creating a vacuum between the cup and the wall surface. When the lever 122a, 123a is in an open position, the suction cup can be easily placed on a surface. When the lever 122a, 123a is closed, it engages the vacuum seal by drawing the cup inward, which maintains or increases the suction force. Opening the lever breaks the vacuum seal, allowing air to enter between the cup and the wall surface and making it easier to detach the suction cup.

The attachment 125 also includes a rigid gate edge 124, i.e., an edge gripper. The gate edge 124 may be a strip, bar or U-shaped sleeve that attaches to the side edge of the gate 115. The attachment 125 may be secured to the side edge by stitching, bonding and/or mechanical fastening. A handle 128 is attached to the gate edge 124. A plurality (e.g., 2) hooks, clips or rings 126 connect the gate edge 124 to rings 122b, 123b on the body 121. The hooks, clips or rings 126 may be configured for releasable engagement. For example, hooks or spring clips (e.g., carabiners) may be used for releasable engagement.

Figure 7:
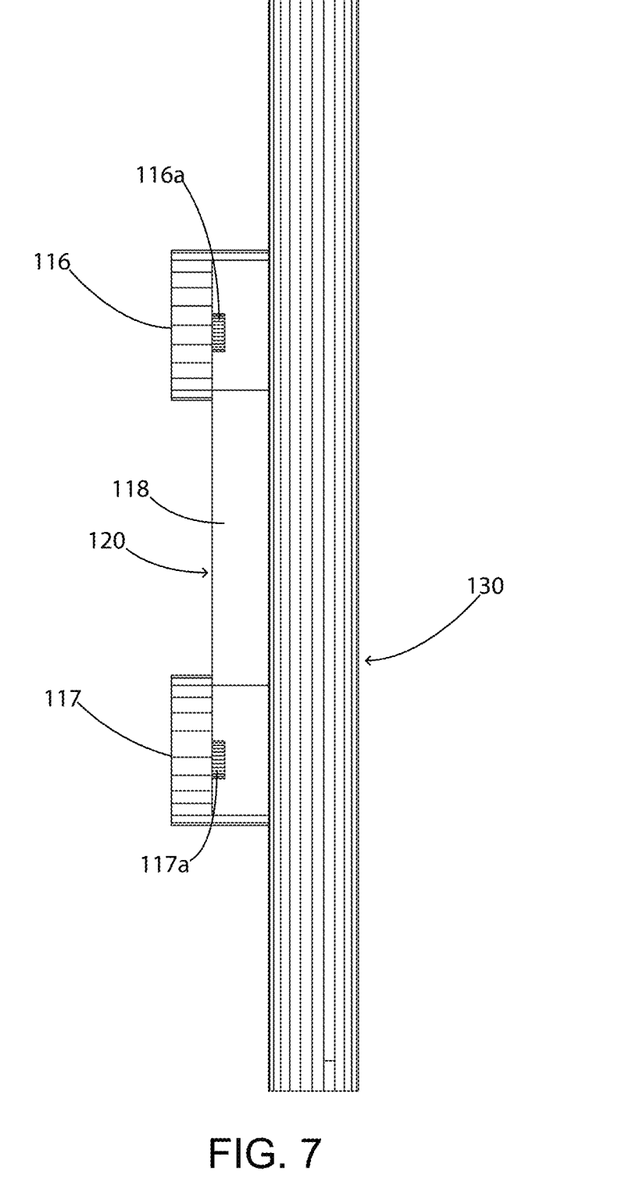
FIG. 7 is a front view of an exemplary roller end wall attachment for a bathtub safety gate according to principles of the invention.
Figure 8:
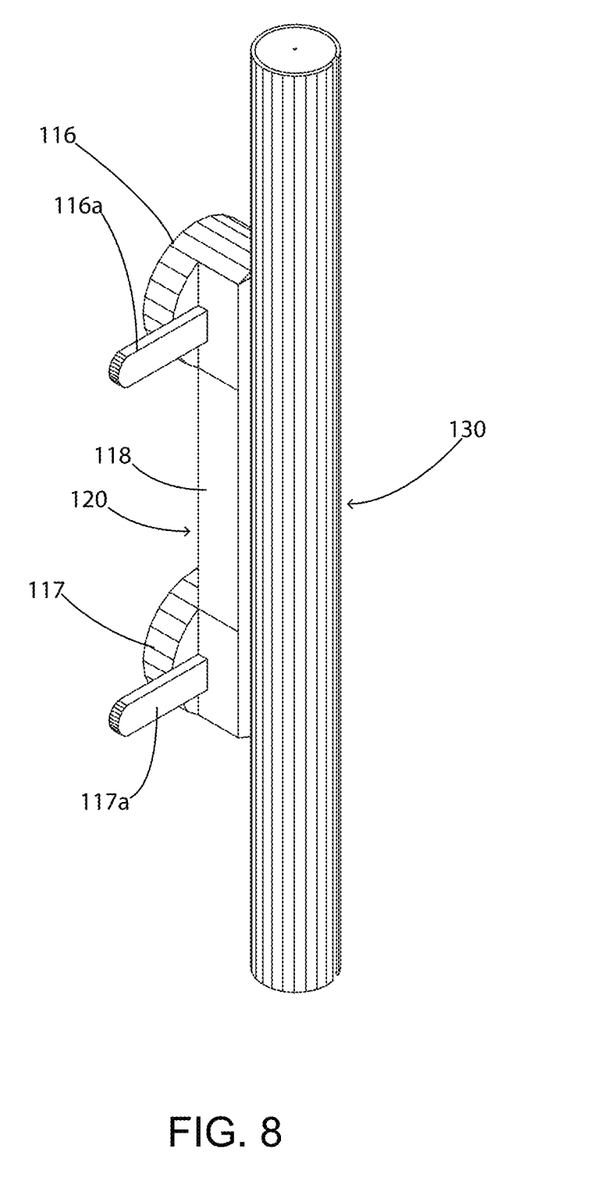
FIG. 8 is a perspective view of an exemplary gate roller end wall attachment for a bathtub safety gate according to principles of the invention.

FIGS. 7 and 8 conceptually illustrate an exemplary gate roller end wall attachment 130 for a bathtub safety gate according to principles of the invention. This attachment 130 differs from attachment 125 in that a rigid body 118 of the suction cup assembly 120 attaches to the roller assembly 130 and not to structures for attachment to an edge of the gate 115. A pair of suction cups 116, 117 extend from one side of the rigid body 121. In the exemplary embodiment, each suction cup 116, 117 includes a suction release lever 116a, 117a. The suction cups 116, 117 releasably engage a wall, such as wall 105.

Each lever-controlled suction cup 116, 117 includes a concave, flexible cup made of an elastomeric material, such as rubber or silicone. Each cup has a lip that helps in creating a seal against a wall surface. To adhere to a wall surface, the suction cup is initially pressed onto the desired area. The flexibility of the cup allows air to be expelled, creating a vacuum between the cup and the wall surface. When the lever 116a, 117a is in an open position, the suction cup can be easily placed on a surface. When the lever 116a, 117a is closed, it engages the vacuum seal by drawing the cup inward, which maintains or increases the suction force. Opening the lever breaks the vacuum seal, allowing air to enter between the cup and the wall surface and making it easier to detach the suction cup.

Figure 9:
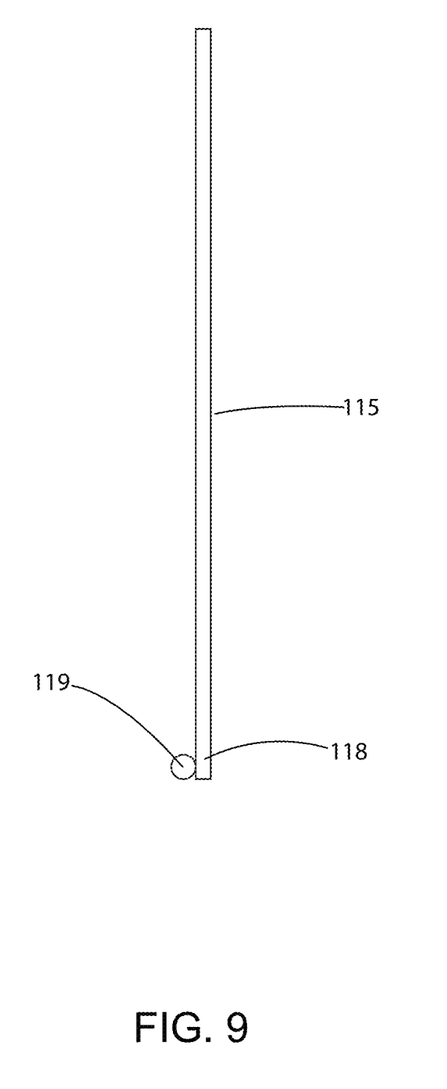
FIG. 9 is a profile view that conceptually illustrates a gate, such as a mesh or solid flexible sheet, with a bulbous bottom edge that is suitable for engaging with a clamp of a bathtub safety gate according to principles of the invention.
Figure 10:
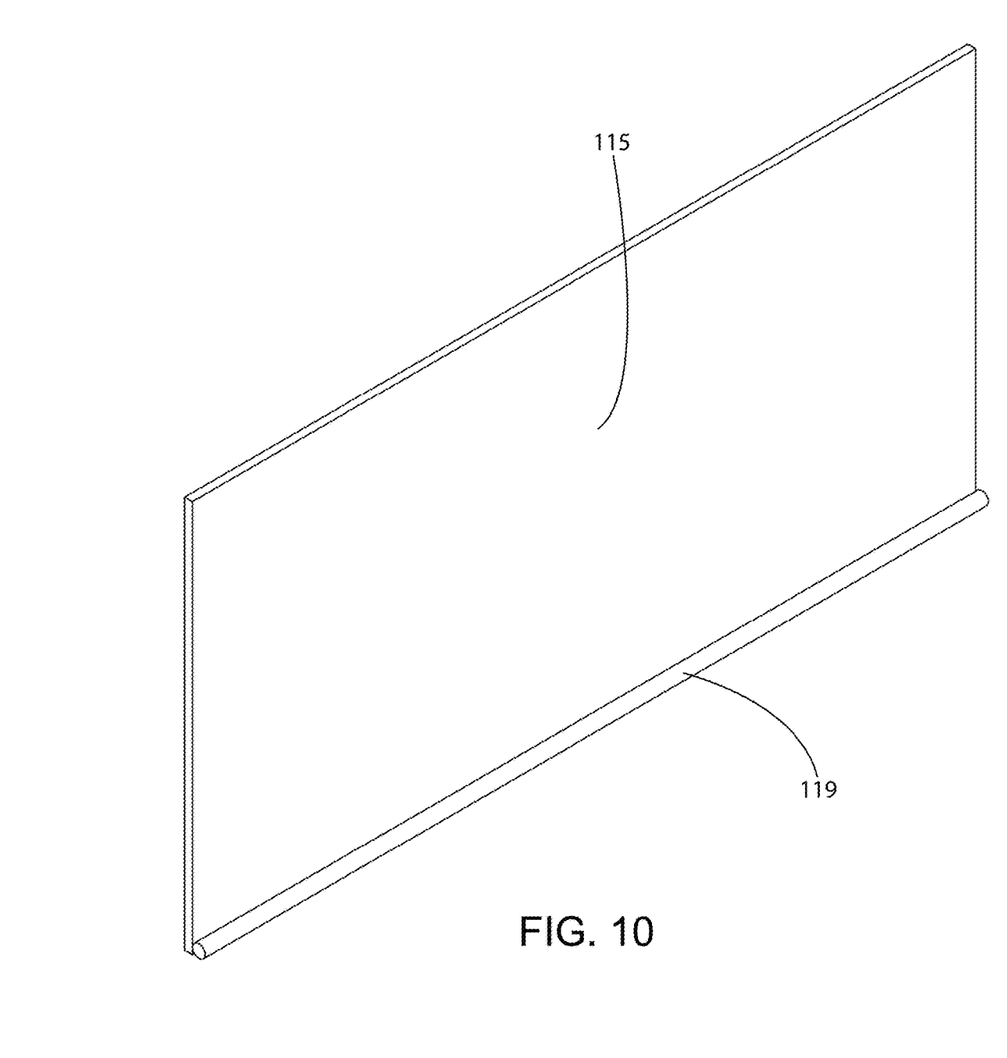
FIG. 10 is a perspective view that conceptually illustrates a gate, such as a mesh or solid flexible sheet, with a bulbous bottom edge that is suitable for engaging with a clamp of a bathtub safety gate according to principles of the invention.

FIGS. 9 and 10 conceptually illustrate a gate 115, such as a mesh or solid flexible sheet, with a bulbous bottom edge that is suitable for engaging with a clamp of a bathtub safety gate according to principles of the invention. The bottom edge 118 includes a bulbous structure 119. The bulbous structure may be a hem (e.g., a border doubled or tripled back and secured down), a sleeve containing a flexible elongated bulbous object such as a tube, or a flexible elongated bulbous object 119 such as a tube attached to the bottom edge or to one side of the bottom end 118 of the gate 115.

The bulbous object may be received in the engagement compartment 137 of the edge retainer 138 of the clamp 135. The edge retainer 138 defines a compartment 137, through which a portion of a bulbous object at the bottom edge of the gate 115 is received. Such engagement impedes movement of the bottom edge of the gate 115 away from the top edge of the side 100 of the tub.

While a generally tubular bulbous object is illustrated, the invention is not limited to a particular shape or point of attachment or formation. Any bulbous structure that an edge retainer 138 of the clamp may engage, and that can be rolled into a roll with the gate 115, may be utilized without departing from the scope of the invention. Concomitantly the shape and configuration of the edge retainer 138 may be configured to engage the bulbous structure. For example, other edge retainer 138s that define engagement compartments having other forms and shapes may be utilized without departing from the scope of the invention.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function, and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A bathtub safety gate comprising
  a flexible sheet having a first edge, an opposite second edge, a bottom edge, a top edge, a retention structure along and coextensive with the bottom edge, the retention structure being flexible;
  a spool;
  a wall attachment assembly, the first edge of the flexible sheet being attached to the spool, the second edge of the flexible sheet being attached to the wall attachment assembly;
  at least one tub clamp, each tub clamp comprising a pair of opposed jaws and a retainer, a distance between the pair of opposed jaws being adjustable, the retainer extending upward from the jaws, the retainer defining a compartment in which the retention structure is received, the retention structure being slidably disposed in the compartment, the retainer defining a slot having a width, a portion of the flexible sheet extending through the slot, the retention structure being thicker than the width of the slot.

2. The bathtub safety gate of claim 1, the retention structure comprising a hem, the hem comprised of a plurality of folded over portions of the flexible sheet at the bottom edge, the folded over portions being fastened together.

3. The bathtub safety gate of claim 1, the retention structure comprising a sleeve containing an insert, the sleeve comprising a folded over portion of the flexible sheet, a portion of the folded over portion being fastened to the flexible sheet, and another portion of the folded over portion defining a compartment in which the insert is contained, the insert being flexible and having a thickness that is greater than a thickness of the flexible sheet.

4. The bathtub safety gate of claim 3, the flexible insert comprising a rope.

5. The bathtub safety gate of claim 1, the retention structure comprising a flexible tube attached to the bottom edge of the flexible sheet, the flexible tube having a thickness that is greater than a thickness of the flexible sheet.

6. The bathtub safety gate of claim 1, further comprising a slotted housing containing the spool, the slotted housing including a vertical slot through which the flexible sheet extends, and the spool being rotatable relative to the slotted housing.

7. The bathtub safety gate of claim 6, further comprising a housing attachment releasably connected to the slotted housing, the housing attachment comprising a housing attachment body, at least two suction cups, and at least one coupling releasably connecting the housing attachment body to the slotted housing.

8. The bathtub safety gate of claim 7, the at least one coupling releasably connecting the housing attachment body to the slotted housing comprising a hook.

9. The bathtub safety gate of claim 7, further comprising a spring mechanism biasing the spool to a wound state.

10. The bathtub safety gate of claim 9, further comprising a damper operably coupled to the spool, the damper damping rotation of the spool.

11. The bathtub safety gate of claim 1, the wall attachment assembly comprising a first body, at least two suction cups, an edge gripper, at least one coupling releasably connecting the first body to the edge gripper, and the edge gripper being attached to the second edge of the flexible sheet.

12. The bathtub safety gate of claim 11, the at least one coupling releasably connecting the first body to the edge gripper comprising a hook.

13. A bathtub safety gate comprising a flexible sheet having a first edge, an opposite second edge, a bottom edge, a top edge, a retention structure along and coextensive with the bottom edge, the retention structure being flexible;
  a spool, a slotted housing containing the spool, the slotted housing including a vertical slot through which the flexible sheet extends, the spool being rotatable relative to the slotted housing, and the first edge of the flexible sheet being attached to the spool;
  a wall attachment assembly, the second edge of the flexible sheet being attached to the wall attachment assembly;
  a housing attachment releasably connected to the slotted housing, the housing attachment comprising a housing attachment body, at least two suction cups, and at least one coupling releasably connecting the housing attachment body to the slotted housing; and
  at least one tub clamp, each tub clamp comprising a pair of opposed jaws and a retainer, a distance between the pair of opposed jaws being adjustable, the retainer extending upward from the jaws, the retainer defining a compartment in which the retention structure is received, the retention structure being slidably disposed in the compartment, the retainer defining a slot having a width, a portion of the flexible sheet extending through the slot, the retention structure being thicker than the width of the slot.

14. The bathtub safety gate of claim 13, the wall attachment assembly comprising a first body, at least two suction cups, an edge gripper, at least one coupling releasably connecting the first body to the edge gripper, and the edge gripper being attached to the second edge of the flexible sheet.

15. The bathtub safety gate of claim 13, further comprising a spring mechanism biasing the spool to a wound state.

16. The bathtub safety gate of claim 15, further comprising a damper operably coupled to the spool, the damper damping rotation of the spool.

17. A bathtub safety gate for a bathtub between opposing walls, including a first wall and an opposite second wall, the bathtub having a side with a top edge, the bathtub safety gate comprising:
  a flexible sheet having a first edge, an opposite second edge, a bottom edge, a top edge, a retention structure along and coextensive with the bottom edge, the retention structure being flexible;
  a spool, a slotted housing containing the spool, the slotted housing including a vertical slot through which the flexible sheet extends, the spool being rotatable relative to the slotted housing, the first edge of the flexible sheet being attached to the spool, and the spool being adjacent to the first wall;
a wall attachment assembly, the second edge of the flexible sheet being attached to the wall attachment assembly, and the wall attachment assembly being adjacent to the second wall;
a housing attachment releasably connected to the slotted housing, the housing attachment comprising a housing attachment body, at least two suction cups, and at least one coupling releasably connecting the housing attachment body to the slotted housing, the two suction cups of the housing attachment being attached to the first wall; and
at least one tub clamp, each tub clamp comprising a pair of opposed jaws and a retainer, a distance between the pair of opposed jaws being adjustable, the pair of opposed jaws gripping the top edge of the side of the bathtub, the retainer extending upward from the jaws, the retainer defining a compartment in which the retention structure is received, the retention structure being slidably disposed in the compartment, the retainer defining a slot having a width, a portion of the flexible sheet extending through the slot, the retention structure being thicker than the width of the slot.

18. The bathtub safety gate of claim 17, the wall attachment assembly comprising a first body, at least two suction cups attached to the first body, an edge gripper, at least one coupling releasably connecting the first body to the edge gripper, and the edge gripper being attached to the second edge of the flexible sheet, the two suction cups of the wall attachment assembly being attached to the second wall.

19. The bathtub safety gate of claim 18, further comprising a spring mechanism biasing the spool to a wound state.

20. The bathtub safety gate of claim 19, further comprising a damper operably coupled to the spool, the damper damping rotation of the spool.

\* \* \* \* \*